Nov. 13, 1956    J. O. HARRISON    2,770,279
VEHICLE TIRE
Filed Jan. 4, 1954

INVENTOR.
John O. Harrison.
BY
Fishburn & Mullendore
ATTORNEYS.

United States Patent Office 2,770,279
Patented Nov. 13, 1956

2,770,279
VEHICLE TIRE

John O. Harrison, Independence, Mo., assignor to Dealers Tire Service, Inc., Kansas City, Mo., a corporation of Missouri Application January 4, 1954, Serial No. 401,826

1 Claim. (Cl. 152—209)

This invention relates to vehicle tires and particularly to those of a type known as snow or winter tires.

It is well known that ordinary tires do not have good traction in cold weather because the material thereof becomes hard and loses the pliability which characterizes good traction. Snow tires have been constructed with large knobs or lugs to give a better gripping action in snow, but the desired pliability is still lacking and such tires are extremely noisy and actually have less traction on dry roads. This has been relieved in part by lugs extending diagonally across the tread of the tires but such tires remain noisy because of air that is trapped within the grooves upon slight flattening of the tread as the wheel revolves on the pavement. The tires also result in an objectionable side sway, particularly on curves.

It is therefore the principal object of the present invention to provide an all season tire with a tread which eliminates the above difficulties by providing excellent traction in cold weather, silent operation, and a smooth even pull without causing side sway.

It is also an object of the invention to provide a tire which operates with a cooler tread because of air cooling which results from arrangement of the traction elements of the tread.

A further object of the invention is to provide a tire tread having angularly related lugs separated by circumferential and angular grooves which intersect each other to avoid entrapment of air; and to provide for division of the lugs into a plurality of sections by relatively narrow grooves to give pliability in cold weather so that when the vehicle is operating in the snow, the weight of the vehicle works the tread. That is, when the weight of the vehicle is applied, the grooves spread apart and take bites of snow and when the weight is released, the material of the tread contracts the grooves and squeezes the snow therefrom to again bite into the snow on the next revolution of the wheel.

In accomplishing these and other objects of the invention, hereinafter pointed out, I have provided improved structure, the preferred form of which is illustrated in the accompanying drawings wherein.

Figure 1:
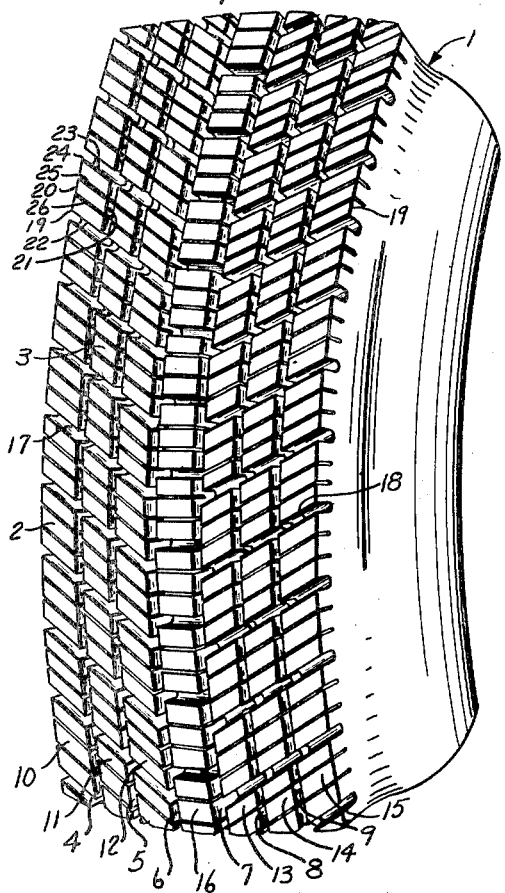
Fig. 1 is a perspective view of a portion of a tire having a tread constructed in accordance with the present invention.
Figure 2:
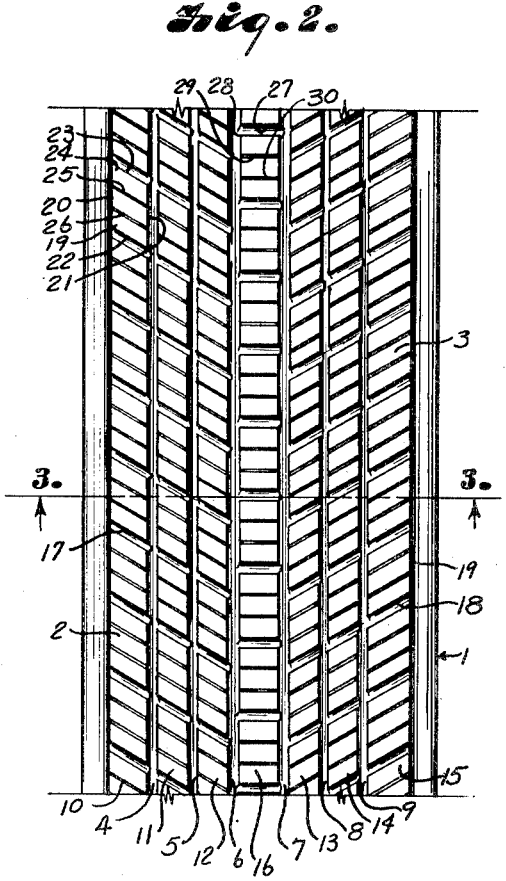
Fig. 2 is a face view of the tread.
Figure 3:
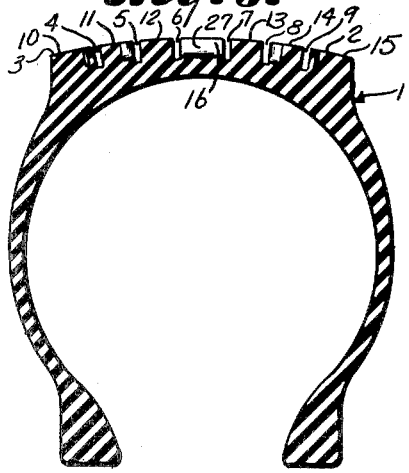
Fig. 3 is a cross section of the tire on the line 3—3 of Fig. 2.

Referring more in detail to the drawings:

Numeral 1 designates a tire which may be any conventional interior construction, but which has a resilient tread 2 embodying the features of the present invention. The tread 2 is built up on the carcass of the tire utilizing rubber or synthetic rubber materials and is of substantial thickness to provide a relatively wide and long wearing traction face or band 3. The face 3 has a plurality of laterally spaced grooves 4, 5, 6, 7, 8, and 9 extending circumferentially to provide annular traction portions or ribs 10—11—12 and 13—14—15 on the respective sides of a central annular portion or rib 16.

The annular traction portions or ribs 10—11—12 and 13—14—15 thus described are divided on the respective sides of the central portion or rib 16 by oppositely angling main grooves 17 and 18 that are spaced apart circumferentially of the tread to form lugs 19 having parallel opposite sides 20 and 21 and angular front and rear edges 22 and 23 to give substantially diamond-shaped and relatively sharp edged main traction lugs 24 that are divided by relatively narrow secondary grooves 25 and 26, which extend parallel with the diagonal grooves 17 and 18 to further increase the number of gripping edges. The side faces of the secondary grooves are spaced apart to provide working clearance for portions of the main lugs 24 between the secondary grooves.

It is thus obvious that the ribs at the respective sides of the central rib 16 each have an angular series of main lugs having edges to effect the desired grip in snow, mud and the like and that each of the lugs is divided by the relatively narrow secondary grooves 25 and 26 to promote pliability and compensate for tendency of the material to harden in cold weather. The particular angular arrangement of the transverse angular grooves also eliminates possibility of the entrapment of air when the tire flattens on contact with the pavement under weight of the vehicle. This is because the grooves at the sides of the traction elements engaging the pavement are interconnected so that there is always air released through one of the relatively large angular grooves at a higher level, thereby eliminating the noise resulting from the entrapment of air.

The angular arrangement of the traction faces of the gripping elements and the pliability brought about through the divisions thereof by means of the slits eliminates noise caused by striking of lugs against the road surface.

The central rib is likewise divided by a series of transverse grooves 27 to cooperate with the side grooves 6 and 7 to form substantially rectangular main lugs 28 that are divided by transverse secondary grooves 29 and 30 corresponding with the transverse secondary grooves 25 and 26, the side faces of the secondary grooves being spaced from each other to promote resiliency of portions of the main lugs between the secondary grooves and to provide working clearance for movement of said portions under weight applied to the tire.

The opposite angling grooves and cuts and relatively wide dimension of the lugs in a transverse direction, result in substantial lateral stability to eliminate side sway. However, the breaking up of the main lugs by the secondary grooves provides for substantial flexibility in the circumferential direction to enhance the gripping characteristic of the tire. This is brought about by working of the tread. That is, the secondary grooves open up under weight of the vehicle to effect substantially wide bites on the snow but as the wheel rotates, the action in the material causes the secondary grooves to close and squeeze the snow therefrom and clean the grooves for the next revolution.

The tire is also an all season tire because the summer heat and heat of traction is reduced by the circulation of air through the respective grooves under the working action of the traction elements. This working action brings about positive movement of air in and around the traction elements to result in a cooler operating tread.

Since the primary and secondary grooves are on an angle of approximately 30 degrees, they cannot come into a position where air is trapped between the wheel and pavement.

It is also obvious that the balanced arrangement of the traction elements and the uniform working of the elements on the respective sides of the center rib, results in a balanced action so that the tread gives a steady even pull in a forward direction. It is also obvious that the ability of the tread to pick up snow and to clean itself results in an actual removal of the snow until traction is attained.

What I claim and desire to secure by Letters Patent is:

A tire having a resilient tread provided with a central traction portion extending circumferentially of the tire and defined by laterally spaced apart annular grooves extending circumferentially of the tire and interconnected by circumferentially spaced apart transverse primary grooves dividing said central portion into spaced apart main lugs, said main lugs having secondary transverse grooves of less width than the transverse primary grooves, with side faces of said secondary transverse grooves spaced from each other to promote resiliency of portions of the main lugs between said secondary transverse grooves and providing working clearance for movement of said portions under weight applied to the tire when the tire is in use, said tread also having two spaced apart annular grooves extending circumferentially of the tire and defining spaced annular traction portions on respective sides of the central traction portion, said spaced, annular traction portions having spaced apart angularly extending primary grooves connecting said annular grooves, with said last named primary grooves on one side of said central traction portion extending in the same direction circumferentially of the tire as said angularly extending primary grooves on the other side of said central portion to form main lugs extending at the same angle as the said angularly extending primary grooves, said angularly extending main lugs having spaced apart angularly extending secondary grooves of less width than said angularly extending primary grooves and having side faces thereof spaced apart to provide working clearance for portions of the lugs between the angularly extending secondary grooves, said transverse primary grooves and said angularly extending primary grooves cooperating with the annular grooves to form continuous passages for escape of any air when the tire flattens under said weight and said resiliency of the portions of the lugs between said secondary grooves providing for self cleaning of said grooves when the tire turns through said flattened position.

References Cited in the file of this patent

UNITED STATES PATENTS

| | | |
|---|---|---|
| D. 67,669 | Merriman | June 23, 1925 |
| D. 102,275 | Hubener | Dec. 8, 1936 |
| D. 158,031 | Wilcox | Apr. 4, 1950 |
| 2,094,636 | Bull | Oct. 5, 1937 |